United States Patent
Hawkes et al.

(10) Patent No.: US 7,428,305 B1
(45) Date of Patent: Sep. 23, 2008

(54) GENERATION OF KEYED INTEGER PERMUTATIONS FOR MESSAGE AUTHENTICATION CODES

(75) Inventors: Philip Hawkes, Burwood (AU); Gregory G. Rose, Mortlake (AU); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/563,648

(22) Filed: May 2, 2000

(51) Int. Cl.
*H04L 9/28* (2006.01)
*H04K 1/00* (2006.01)

(52) U.S. Cl. .................... 380/28; 380/37; 713/189
(58) Field of Classification Search .................... 380/28, 380/37
See application file for complete search history.

(56) References Cited

U.S. PATENT DOCUMENTS

| | | | | |
|---|---|---|---|---|
| 4,754,482 A | * | 6/1988 | Weiss | 713/181 |
| 4,850,019 A | * | 7/1989 | Shimizu et al. | 380/29 |
| 4,969,190 A | * | 11/1990 | Takaragi et al. | 380/43 |
| 5,077,793 A | * | 12/1991 | Falk et al. | 380/28 |
| 5,511,123 A | * | 4/1996 | Adams | 380/29 |
| 6,038,317 A | * | 3/2000 | Magliveras et al. | 380/28 |
| 6,185,679 B1 | * | 2/2001 | Coppersmith et al. | 380/37 |

FOREIGN PATENT DOCUMENTS

WO 00/51286 8/2000

OTHER PUBLICATIONS

Constructing Symmetric Ciphers Using the CAST Design Procedure, Designs, Codes and Cryptography 12(3) Nov. 1997.*
Dorothy Denning, Cryptography and Data Security, Addison-Wesley 1982.*

(Continued)

*Primary Examiner*—Kim Vu
*Assistant Examiner*—Ponnoreay Pich
(74) *Attorney, Agent, or Firm*—Kyong H. Macek; Won Tae C. Kim; Thomas R. Rouse

(57) ABSTRACT

A method for constructing keyed integer permutations over the set $Z_N$, where N can be factored into p and q, or N can be prime. N bits are permuted by deriving a keyed permutation of representative indices. When N is factorable into p and q, the set of indices are divided into two portions. The portions undergo iterative processing called "rounds," and in each round, a first half-round function operates on the first portion to form a first half-round value; the first half-round value and the second portion are added together by a modulo-p adder to form a first output value; a second half-round function operates on the second portion to form a second half-round value; and the second half-round value and the first portion are added together by a modulo-q adder to form a second output value. In this manner, outputs of the rounds are reordered.

If N is prime and not less than 13, then N is separated into composite values s and t, and two sets are formed with s and t elements, respectively. Each set is then permuted using the method for when N is not prime. At the end of each round, the two blocks are combined using a mixing operation.

36 Claims, 8 Drawing Sheets

OTHER PUBLICATIONS

Willi Meier, On the Security of the IDEA Block Cipher.*
Adina Di Porto et. al. VINO: A Block Cipher Including Variable Permutations.*
R. P. Chambers, Random-number Generation, IEEE Spectrum Feb. 1967.*
Y. Zheng, On the Construction of Block Ciphers Provably Secure and Not Relying on Any Un proved Hypotheses.*
Shannon, Communication Theory of Secrecy Systems.*
"Chinese remainder theorem—Wikipedia, the free encyclopedia", pp. 1-4, last visited May 5, 2006.*
"RSA—Wikipedia, the free encyclopedia", pp. 1-8, last visited May 5, 2006.*
Y. Zheng, On the Construction of Block Ciphers Provably Secure and Not Relying on Any Un proved Hypotheses, 1989.*
Shannon, Communication Theory of Secrecy Systems, 1949.*
Willi Meier, On the Security of the IDEA Block Cipher, 1998.*
Adina Di Porto et. al. VINO: A Block Cipher Including Variable Permutations, 1993.*
B. Schneier et al., "Unbalanced Feistel Networks and Block Cipher Design," Fast Software Encryption. International Workshop, 1996 (pp. 121-144).

* cited by examiner

GENERATION OF KEYED INTEGER PERMUTATIONS FOR MESSAGE AUTHENTICATION CODES

BACKGROUND OF THE INVENTION

I. Field of the Invention

The present invention pertains generally to the field of communications and more particularly to constructing keyed permutations over a set of integers modulo-N for use in a message authentication code.

II. Background

A message authentication code (MAC) is a cryptographically derived item that may be appended to a particular message in order to verify that the message originated from a particular party and was not altered by any other party. It stands to reason that MACs find use in many fields of telecommunications. An exemplary field is wireless communications.

The field of wireless communications has many applications including, e.g., cordless telephones, paging, wireless local loops, wireless data applications such as personal digital assistants (PDAs), wireless telephony such as cellular and PCS telephone systems, mobile Internet Protocol (IP) telephony, and satellite communication systems. A particularly important application is wireless telephony for mobile subscribers.

Various over-the-air interfaces have been developed for wireless communication systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile Communications (GSM), and Interim Standard 95 (IS-95).

An exemplary wireless telephony communication system is a code division multiple access (CDMA) system. The IS-95 standard and its derivatives, IS-95A, ANSI J-STD-008, IS-95B, proposed third generation standards IS-95C and IS-2000, proposed high-data-rate CDMA standards exclusively for data, etc. (referred to collectively herein as IS-95), are promulgated by the Telecommunication Industry Association (TIA) and other well known standards bodies to specify the use of a CDMA over-the-air interface for cellular or PCS telephony communication systems. Exemplary wireless communication systems configured substantially in accordance with the use of the IS-95 standard are described in U.S. Pat. Nos. 5,103,459 and 4,901,307, which are assigned to the assignee of the present invention and fully incorporated herein by reference.

One method for encrypting data sent over wireless systems is the Data Encryption Standard (DES), promulgated by the National Institute of Standards and Technology in FIPS PUB 46-2 (Dec. 30, 1993), which uses Feistel Networks to convert binary coded information into a cipher. A Feistel Network is used in the DES to convert a data block of length 64 bits. First, an initial permutation step is performed on the 64 bit block of data. The permuted data block is divided into two halves of length 32 bits, where one block is labeled L and the other is labeled R. An iterative procedure then manipulates the blocks using the following relationships:

$L_i = R_{i-1}$, $R_i = L_{i-1} \oplus f(R_{i-1}, K_i)$, where $K_i$ is the subkey used in the ith round and $f$ is an arbitrary function. The function $f$ is also referred to as a "round" function because each iterative step is referred to as a round. In the DES algorithm, round function $f$ is composed of four operations. First, a 48 bit subkey is selected from the 56 bits of a key. Then the round function $f$ comprises the steps of expanding the right half block of the data from 32 bits to 48 bits via an expansion permutation, combining this result with the 48 bit subkey via an XOR operation, sending the result through 8 substitution boxes, which produces 32 additional bits, and permuting the results. The output of function $f$ is combined with the left half block through another XOR operation and the result is used as the new right half block, while the old right half block is used as the new left half block for the next round. The DES round is reversible because $f$ can be reconstructed in each round to satisfy the relationship, $L_{i-1} \oplus f(R_{i-1}, K_i) \oplus f(R_{i-1}, K_i) = L_{i-1}$.

Due to the binary format of data blocks, prior art methods such as DES encrypt a plaintext message, whose elements are members of the set of Cartesian products $Z_2 \times Z_2 \times \ldots \times Z_2$ for n terms, into a ciphertext message, whose elements are also members of the set $Z_2 \times Z_2 \times \ldots \times Z_2$ for n terms. As used herein, $Z_m$ is a cyclic group $\{0, 1, \ldots, m-1\}$ under addition modulo m. Hence, the purpose of DES is not to change the order of the bits in a plaintext (e.g., original data) message. Rather, the purpose of DES is to generate a ciphertext wherein each of the bits of the ciphertext depends on all of the bits of the plaintext.

Since DES is reversible and converts $2^{64}$ inputs to $2^{64}$ outputs under the control of a key, DES can also be viewed as a method for a key to choose a permutation of the set of integers $\{0, 1, \ldots, 2^{64}-1\}$, such that the permutation chosen by the key must remain concealed from unauthorized parties.

In a typical communication, the MAC is the output of a function, wherein a message and a shared secret key K, known only by the message originator and recipient, are the inputs to the function. If the particular function chosen is secure, then an active attacker who can intercept and potentially modify the messages sent can neither discover the key K nor create messages that will be accepted by the recipient as valid with a reasonable probability.

A new type of MAC has been proposed in U.S. patent application Ser. No. 09/371,147, entitled, "METHOD AND APPARATUS FOR GENERATING A MESSAGE AUTHENTICATION CODE," filed on Aug. 9, 1999, which is assigned to the assignee of the present invention and fully incorporated herein by reference, wherein the MAC relies on reordering the bits of an m-bit data block under the influence of some key, and constructing an x-bit cyclic redundancy check (CRC) that is a linear function of the reordered m-bit block. This MAC is referred to as a CRC-MAC. A sender transmits the original m-bit data block along with the CRC-MAC to a receiver. The receiver uses the shared key to re-order the bits of the received data message. The receiver will then compute a CRC from the resulting block. Using this method, a receiver is able to detect if the data was altered in transit and to correct a small number of errors that may have occurred during transmission, while still making it difficult for an active attacker to forge or alter messages.

It is well known that m and x are optimal when $m+x=2^{x-1}-1$. The construction of an x-bit CRC-MAC is discussed in more detail in U.S. patent application Ser. No. 09/371,147. Those of ordinary skill in the art know that a 16-bit CRC proves to be of particular use in the field of wireless communications. Using the number x=16 in the relationship above, the optimal size of a data block for construction of a CRC-MAC is $m=(2^{15}-1)-16=32,751$ bits.

As described above for the optimal values of m and x, the CRC-MAC requires a method for using a key to construct an m-bit intermediate block, wherein $m=(2^{x-1}-1)$, by re-ordering the bits of the original m-bit data block. As described in U.S. patent application Ser. No. 09/371,147, the construction of an m-bit intermediate block can be performed using two algorithms. The first algorithm processes each of the indices to the bits in the m-bit data block. For each index x associated with each bit position of the m-bit data block, the first algorithm calls on the second algorithm to determine a unique index y in the same range as x, wherein y is determined from x and a shared secret key. The first algorithm then sets the value in bit position y of the intermediate block to the value of the bit in position x of the data block.

After the first algorithm has performed these steps for each of the indices x in the range $\{0, 1, \ldots, m-1\}$, the intermediate block will be an m-bit block that contains the bits of the data block in a different order. For the CRC-MAC to be secure, it is necessary that, for any given key, the first algorithm does not place two bits from the data block in the same position of the intermediate block. This condition is satisfied only if, for each key, the second algorithm defines a one-to-one mapping for the set $\{0, 1, \ldots, m-1\}$ onto itself. A one-to-one mapping is commonly referred to as a permutation in the art. Therefore, the CRC-MAC requires a method that uses a key to define a permutation on the set $\{0, 1, \ldots, m-1\}$. Furthermore, the permutation chosen by the key must remain concealed from unauthorized parties.

DES can be considered as a method for using a key to determine a permutation over the set of integers $\{0, 1, \ldots, 2^{64}-1\}$, such that the permutation chosen by the key must remain concealed from unauthorized parties. If the value of m were $2^{64}$, then the DES would satisfy the requirements for the second algorithm. However DES and other block ciphers cannot be used as the second algorithm because such ciphers have only been constructed for the purpose of creating one-to-one relationships between sets of order $2^M$, and do not define one-to-one relationships between sets of other orders. Otherwise, the properties of a block cipher satisfy the conditions required for the second algorithm, and the second algorithm would be implemented for the same notion of security.

Some public-key encryption algorithms, such as the RSA algorithm and the El-Gamal algorithm, disclose methods for a key to define a permutation on $Z_N$ for certain values of N other than power of two. However, these methods should not be used with CRC-MACs because these public key algorithms are insecure for small values of N, such as 32,751. For the values of N that are required for the CRC-MAC, the permutation chosen by a key must be concealed from unauthorized parties.

Hence, there exists a present need to permute a large number N of data bits for the CRC-MAC. In the optimal case referred to above, the data block should contain 32,751 bits. As described above, permuting N bits requires a method for a key to define a permutation on the set $\{0, 1, \ldots, N-1\}=Z_N$ such that the permutation chosen by the key remains concealed from unauthorized parties. Such a method is required that is applicable for any value of N, where N can be either composite or prime. A prime number is an integer greater than 1 whose only factors are 1 and itself. A composite number is an integer greater than 1 that is not prime. Such a method can be applied in a wide variety of applications beyond message authentication and error-correction in telecommunications systems.

SUMMARY

When the value of N is not a power of two (2), the present invention addresses the need for a method in which a key defines a permutation on the set $Z_N$, such that the permutation chosen by the key remains concealed from unauthorized parties. The present invention is applicable for all integers N greater than or equal to thirteen (13). Separate methods are used according to whether N is prime or composite.

The present invention is directed to a method for permuting an N-bit block of data, wherein each bit of the N-bit block of data is associated with an index from a plurality of N indices. If N is composite, and N can be factored into an integer value p greater than one and an integer value q greater than one, then the present invention is directed to a method of obtaining an output value from an input value by performing several rounds, each round comprising the steps of: separating the input value into a first portion and a second portion, wherein the first portion is constructed over a group $Z_p$ and the second portion is constructed over a group $Z_q$ and the input value can be expressed as a combination of the second portion and the first portion, wherein the first portion is multiplied by the integer value q; constructing a first half-round key and a second half-round key; deriving a first half-round value from the second portion and the first half-round key, wherein the first half-round value is an output of a first nonlinear function operating on the second portion and the first half-round key; using a modulo-p adder to combine the first half-round value with the first portion to produce a third portion; deriving a second half-round value from the third portion and the second half-round key, wherein the second half-round value is an output of a second nonlinear function operating on the third portion and the second half-round key; using a modulo-q adder to combine the second half-round value and the second portion; and constructing an output value from the round by multiplying the third portion by the integer value q and then adding the second half-round value.

If N is prime, and greater than thirteen (13), then N can be written as the addition of two composite integers S and T, such that the set $Z_N$ can be partitioned into two sets A and B, wherein the number of elements in set A equals S and the number of elements in set B equals T. The above method for composite N can be applied to define a permutation on the set A and to define a permutation on the set B, wherein an output value is obtained from an input value by performing several rounds, each of which consists of a prime round and a mixing round, with the final round comprising only a prime round. The prime round comprises the steps of: determining if a round input value is in the set A or the set B; if the value is in set A, then determining a first value from the input value using the permutation on the set A defined by a round key as described above, and if the value is in the set B, then determining a first value from the input using the permutation on the set B defined by a round key as described above; and the mixing round comprises the step of inputting the first value to a simple permutation on the entire set $Z_N$ to produce the round output, wherein the simple permutation has the property that approximately S/N of the values in A are mapped to values in A.

DETAILED DESCRIPTION OF THE PREFERRED EMBODIMENTS

Figure 1:
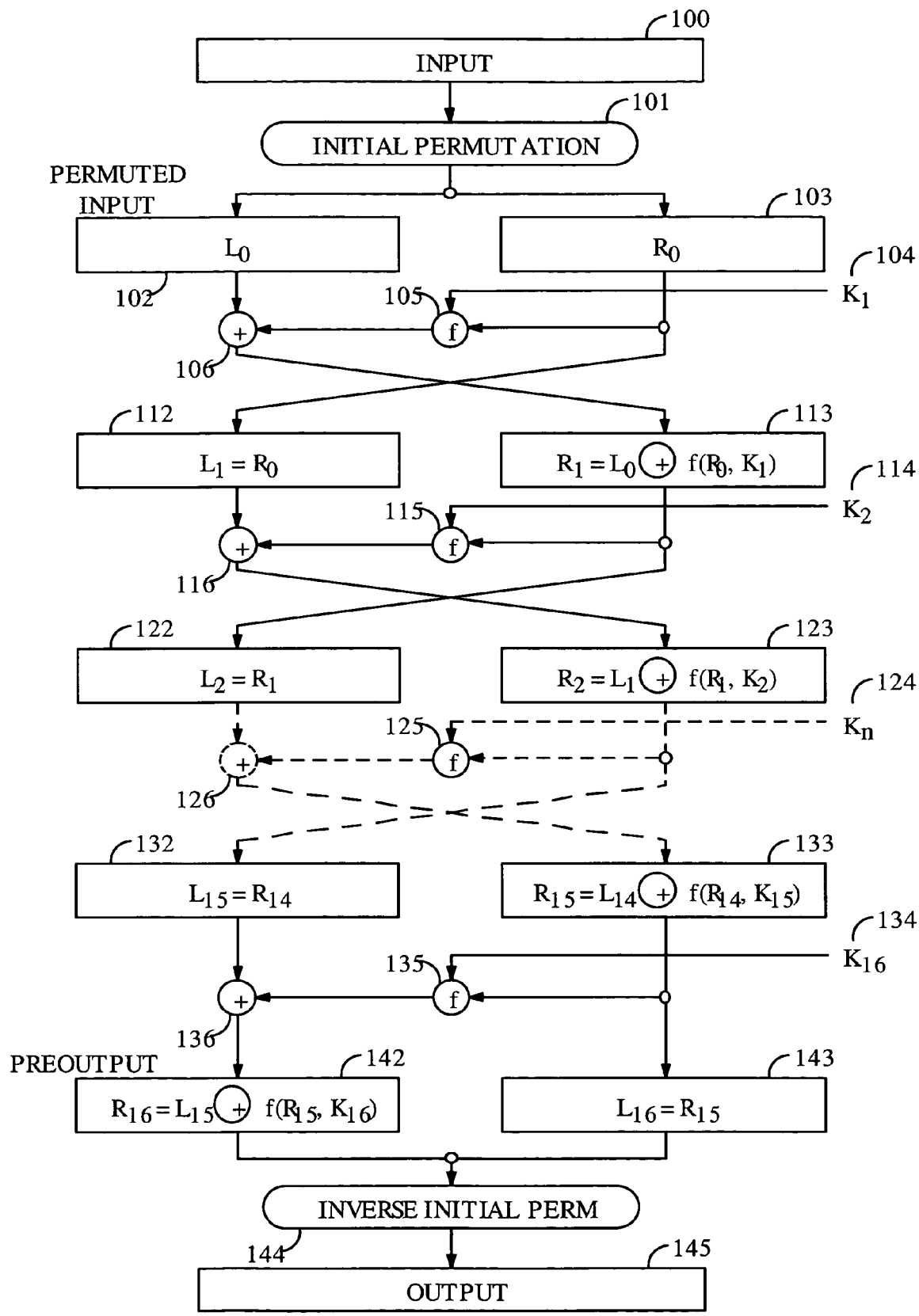
FIG. 1 is a flow chart of a prior art enciphering computation named DES.

FIG. 1 is a block diagram of a prior art enciphering computation as specified by the Data Encryption Standard (DES) published in FIPS PUB 46-2 (Dec. 30, 1993). A 64-bit block of input 100 is permuted according to an initial permutation step 101. The results of initial permutation step 101 are block $L_0$ 102 and block $R_0$ 103.

At the first round, block $R_0$ 103 and a block of key bits $K_1$ 104 are operated upon by a function ƒ 105. The output of function ƒ 105 and the block $L_0$ 102 are combined using a modulo-2 adder 106 to form block $R_1$ 113. Block $L_1$ 112 is set equal to block $R_0$ 103.

At the second round, block $R_1$ 113 and a block of key bits $K_2$ 114 are operated upon by the function ƒ 115. The output of function ƒ 115 and the block $L_1$ 112 are combined using a modulo-2 adder 116 to form block $R_2$ 123. Block $L_2$ 122 is set equal to block $R_1$ 113.

The procedure described for the first round and the second round is repeated until 16 rounds are completed. During the $n^{th}$ round, a block of key bits $K_n$ 124 and a block $R_n$ are operated upon by a function ƒ 125, and the output of this operation is combined with a block $L_n$ using a modulo-2 adder 126. At the last round, block $R_{16}$ 142 and block $L_{16}$ 143 are inputs into an inverse initial permutation step 144 to form output 145.

The DES method operates on blocks of bits, and other block ciphers also operate on blocks of bits. Hence, the present state of the art focuses on the encryption of blocks of size $2^n$, wherein n is generally the number of bits in the block. The present invention is an improvement that is directed toward the encryption of values from a set of any size.

Figure 2:
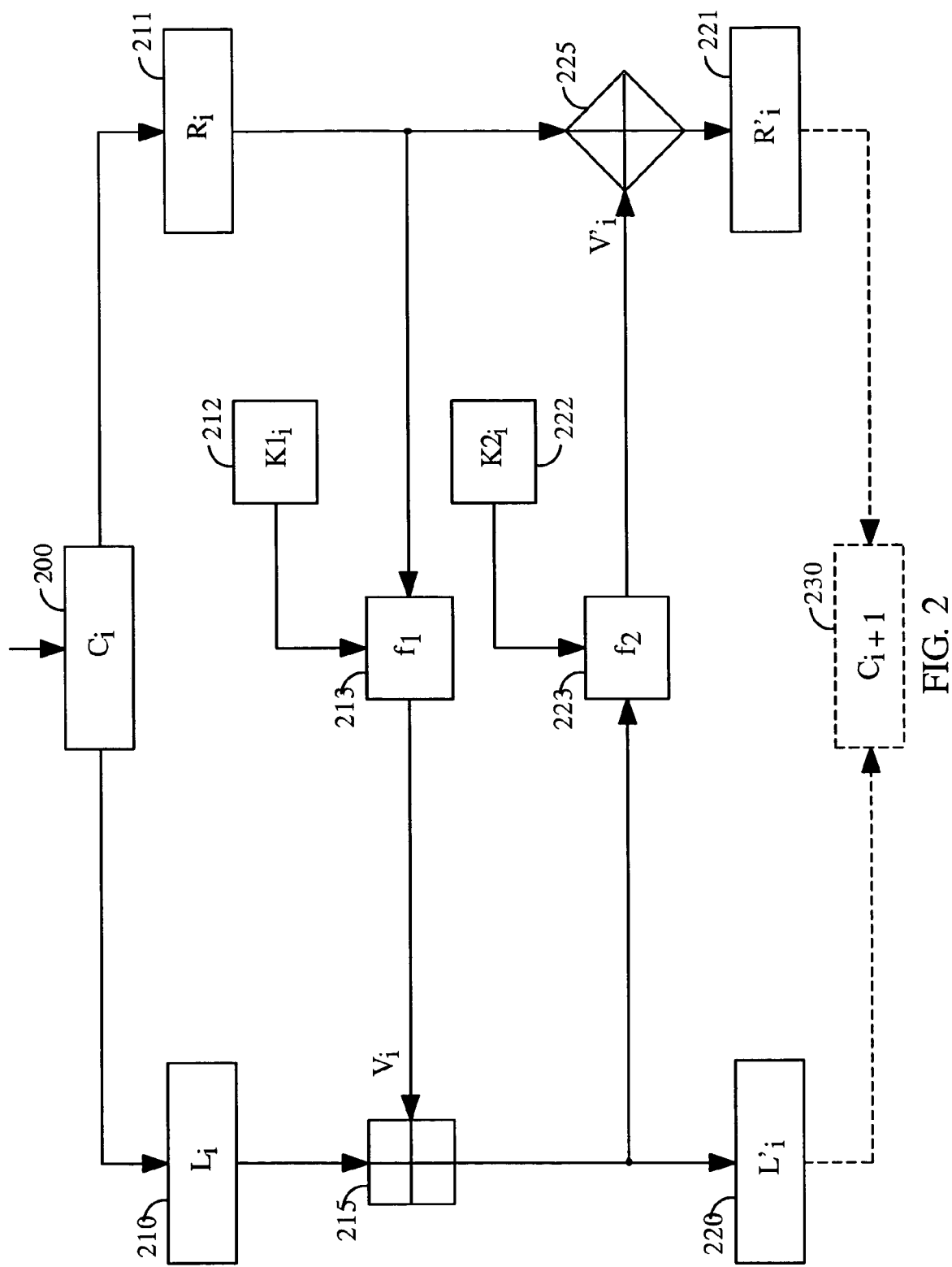
FIG. 2 is a block diagram of an enciphering computation that is an embodiment of the invention, wherein the enciphering computation uses a modulo-p adder and a modulo-q adder.

FIG. 2 is a block diagram of an exemplary embodiment of one round of the invention, wherein a keyed integer permutation (KIP) is constructed over $Z_N$ and N is not prime. Let N=pq for some integers p>1 and q>1. Input $C_i$ 200 is separated into two portions, portion $L_i$ 210 and portion $R_i$ 211, such that $C_i=L_i \cdot q+R_i$, $L_i \in Z_p$ and $R_i \in Z_q$. Portion $R_i$ 211 and a half-round key $K1_i$ 212 are operated upon by a non-linear function $f_1$ 213 to form a half-round value $v_i$. Half-round value $v_i$ is added to portion $L_i$ using a modulo-p adder 215 to form portion $L'_i$ 220. Portion $L'_i$ 220 and a half-round key $K2_i$ 222 are operated upon by a non-linear function $f_2$ 223 to form a half-round value $v'_i$. Half-round value $v'_i$ and portion $R_i$ 211 are added together using a modulo-q adder 225 to obtain portion $R'_i$ 221. An output portion $C_{i+1}$ 230 is formed by the equation $C_{i+1}=L'_i \cdot q+R'_i$. In the alternative, portion $L'_i$ 220 and portion $R'_i$ 221 can be used in the next iterative round.

The method described in FIG. 2 is reversible, that is, $C_i$ can be determined from $C_{i+1}$. First, $C_{i+1}$ is separated into the portions $L'_i$ and $R'_i$, satisfying the relationship $C_{i+1}=L'_i \cdot q+R'_i$. To derive $R_i$, obtain $v'_i=f_2(L'_i, K2_i)$ and subtract the half-round value $v'_i$ from $R'_i$ (modulo q). The resultant value is $R_i$. Once $R_i$ is known, the value $L_i$ is derived from evaluating $v_i=f_1(R_i, K1_i)$ and subtracting the half-round value $v_i$ from $L'_i$ (modulo p). The resultant value is $L_i$. The value of $C_i$ is determined as $C_i=L_i \cdot q+R_i$.

Figure 3:
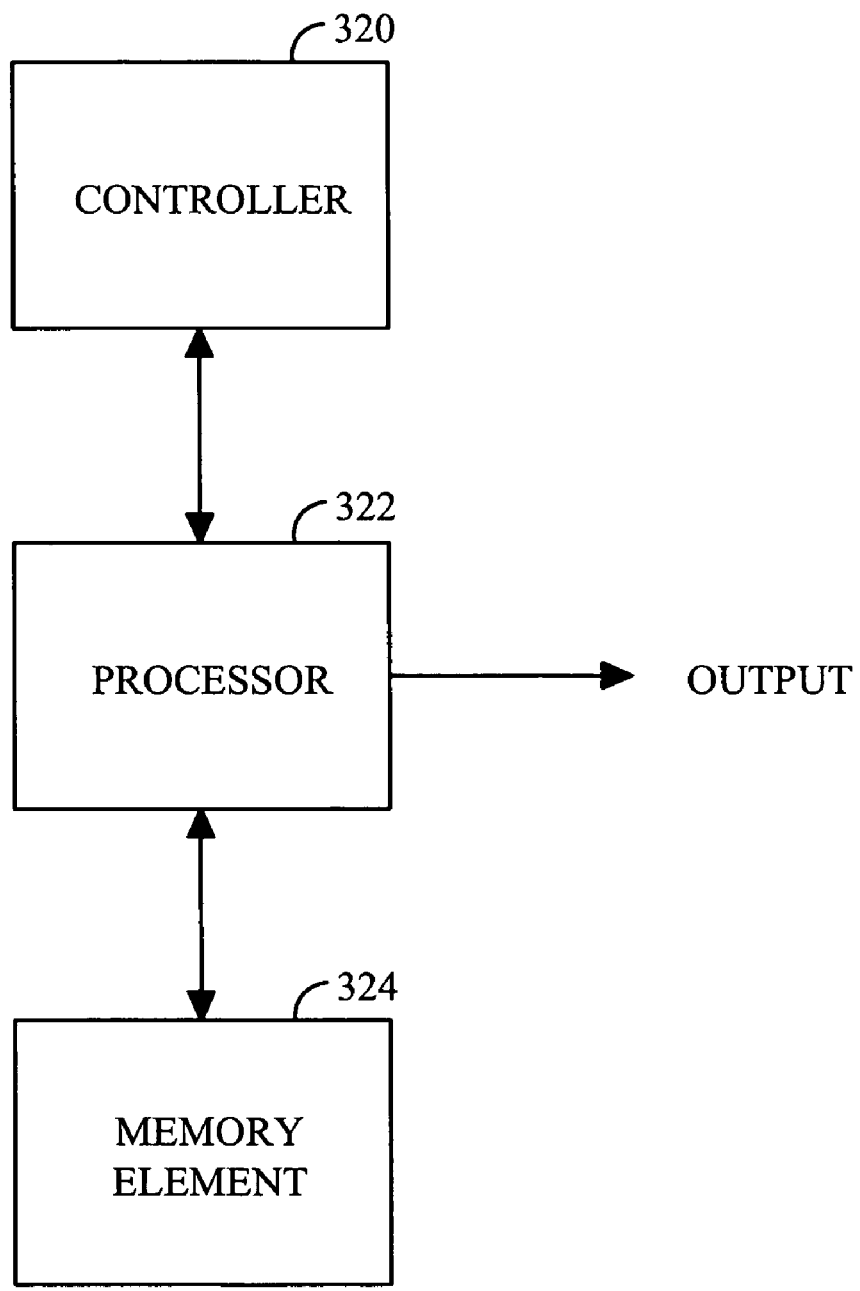
FIG. 3 is a block diagram of an integer permutation device using a processor.

FIG. 3 is a block diagram of a integer permutation device using a processor. Controller 320 connects to processor 322 and comprises the set of instructions that directs the operation of processor 322. Controller 320 can comprise a software program or a set of microcodes. Processor 322 is the hardware that performs the manipulation required by the permutation device. Processor 322 can be implemented as a microcontroller, a microprocessor, or a digital signal processor designed to perform the functions described herein. Memory element 324 connects to processor 322 and is used to store values and instructions. Memory element 324 can be implemented with random-access-memory or other memory devices designed to perform the functions described herein. The instructions and values can be stored in read-only memory or random access memory or any other memory device.

Figure 4:
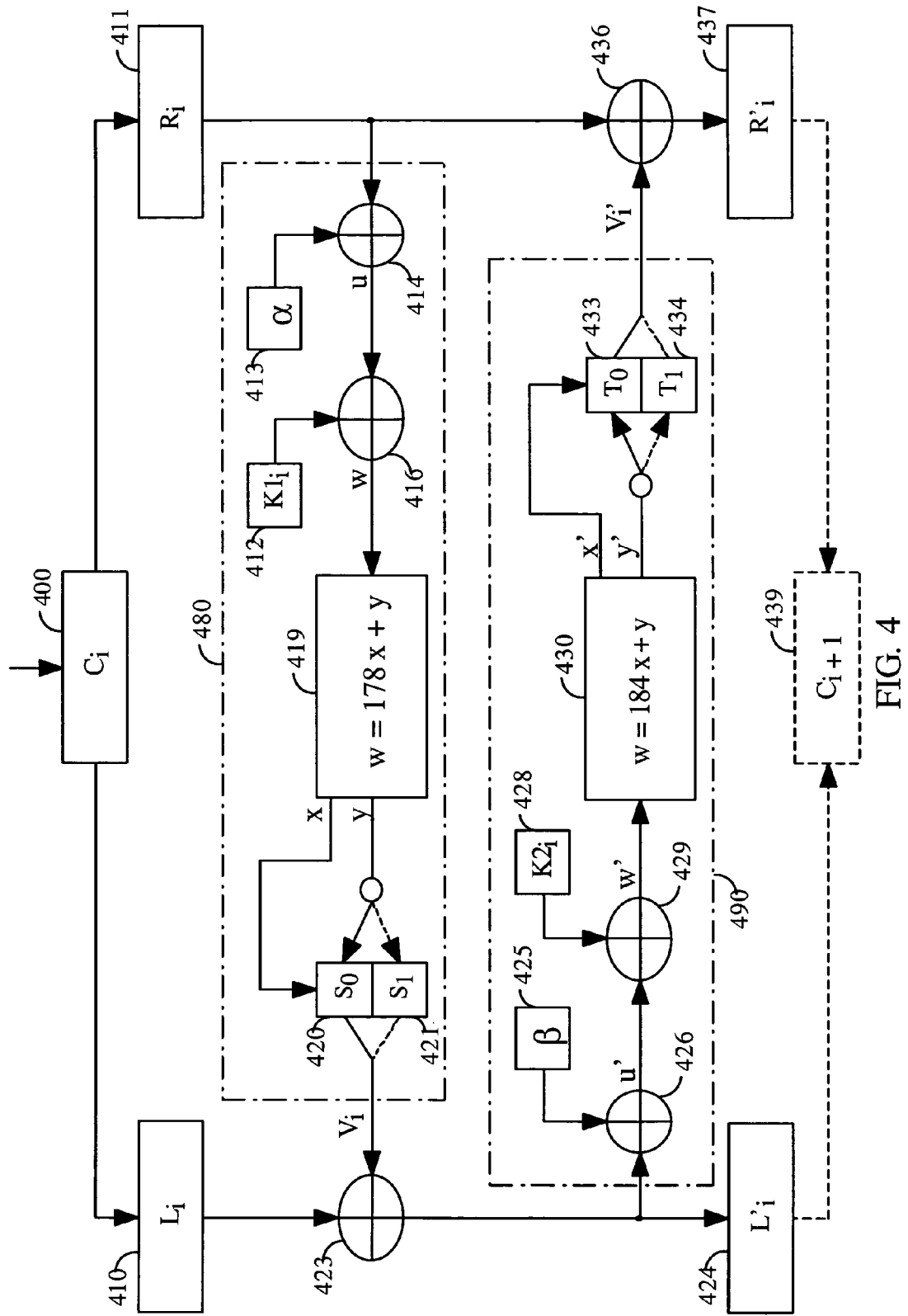
FIG. 4 is a block diagram of an enciphering computation over $Z_{32752}$.

The method of generating a keyed integer permutation over $Z_N$, as discussed broadly in FIG. 2, can be altered to accommodate various choices for p and q. FIG. 4 is a block diagram of an embodiment of one round of a keyed integer permutation method wherein p=178 and q=184, so that N=32752. In addition, the number 32752 can be factored into $89 \times 23 \times 2^4$, wherein $89 \times 2=178$ and $23 \times 2^3=184$. Input $C_i$ 400 is separated into two portions, portion $L_i$ 410 and portion $R_i$ 411 such that $C_i=184 \cdot L_i+R_i$. Portion $L_i$ 410 can be derived from $L_i=C_i$ div 184, (A div B is the integer part of (A÷B)). Portion $R_i$ 411 can be derived from $R_i=C_i$ mod 184.

Portion $R_i$ 411 and constant α 413 are multiplied together by modulo-356 multiplier 414 to produce multiplication result u. Multiplication result u and half-round key value $K1_i$ 412 are added together by modulo-356 adder 416 to produce combined result w. It should be noted that the integer value 356=2*178. At step 419, combined result w is decomposed by the relationship w=x*m+y into substitution indicator value x and substitution input value y, wherein substitution indicator value x is an element of the set $Z_2$, substitution input value y is an element of the set $Z_m$, and m is set equal to p, which in this particular embodiment is p=178. Substitution indicator value x is used to choose one of two substitution boxes, $S_0$ 420 and $S_1$ 421, wherein each substitution box $S_0$ 420 and $S_1$ 421 is a permutation over $Z_{178}$. After substitution indicator value x is used to choose a substitution box $S_x$, substitution input value y is operated upon by the substitution box $S_x$ to obtain half-round value $v_i$. Half-round value $v_i$ and portion $L_i$ 410 are operated upon by modulo-178 adder 423 to obtain portion $L'_i$ 424.

Portion $L'_i$ 424 and constant β 425 are multiplied together by modulo-368 multiplier 426 to produce multiplication result u'. It should be noted that integer value 368=2*184. Multiplication result u' and half-round key value $K2_i$ 428 are added together by modulo-368 adder 429 to produce combined result w'. At step 430, combined result w' is decomposed by the relationship w'=x'*n+y' into substitution indicator value x' and substitution input value y', wherein substitution indicator value x' is an element of the set $Z_2$, substitution input value y' is an element of the set $Z_n$, and n is set equal to q, which in this particular embodiment is q=184. Substitution indicator value x' is used to choose one of two substitution boxes, $T_0$ 433 and $T_1$ 434, wherein each substitution box $T_0$ 433 and $T_1$ 434 is a permutation over $Z_{186}$. After substitution indicator value x' is used to choose a substitution box $T_{x'}$, substitution input value y' is operated upon by the substitution box $T_x'$ to obtain half-round value $v'_i$. Half-round value $v'_i$ and portion $R_i$ 411 are operated upon by modulo-178 adder 436 to obtain portion $R'_i$ 437.

The two functions $f_1$ 480 and $f_2$ 490 chosen for the keyed integer permutation are similar to each other in structure. The function $f_1$ 480 multiplies the input by a constant and reduces the result modulo-2p, resulting in a value u. In the aforementioned embodiment of the invention, 2p=356. The function $f_2$ 490 multiplies the input by a constant β=368 and reduces the result modulo-2q (2q=368), resulting in a value u'. The constants α and β are chosen such that α and 356 are relatively prime, and β and 368 are relatively prime. For example, the constant α can be set to equal the integer value 33 because 33 and 356 are relatively prime. Following the multiplication, a half-round key is added modulo-356, resulting in an output value w that is then expressed as w=x*m+y, where x∈$Z_2$, y∈$Z_j$, and j has value p or q respectively. The value of x is used to choose one of two substitution boxes. In function $f_1$ 480, these two substitution boxes are denoted $S_0$, $S_1$ and each substitution box is a permutation over $Z_{178}$. In functions $f_2$ 490, these two substitution boxes are denoted $T_0$, $T_1$ and each substitution box is a permutation over $Z_{184}$. The output of $f_1$ is $v_i=S_x(y)$, while the output of $f_2$ is $v'_i=T_x(y)$.

Determination of Half-Round Key Values $K1_i$ and $K2_i$

Half-round key values in this embodiment of the invention can be generated by the SOBER II stream cipher, which is described in U.S. Pat. No. 6,510,228, entitled, "METHOD AND APPARATUS FOR GENERATING ENCRYPTION STREAM CIPHERS," issued on Jan. 21, 2003; U.S. Pat. No. 6,252,958, entitled, "METHOD AND APPARATUS FOR GENERATING ENCRYPTION STREAM CIPHERS," issued on Jun. 26, 2001; U.S. Pat. No. 6,490,357, entitled, "METHOD AND APPARATUS FOR GENERATING ENCRYPTION STREAM CIPHERS," issued on Dec. 3, 2002; and U.S. Pat. No. 6,560,338, entitled, "METHOD AND APPARATUS FOR GENERATING ENCRYPTION STREAM CIPHERS," issued on May 6, 2003. The aforementioned patent applications are assigned to the assignee of the present invention, but will not be discussed herein. However, it should be noted that any stream cipher can be used to generate the half round key values if the stream cipher produces bytes that are evenly distributed. Note that if such a stream cipher produces bytes of output, denoted $s_0, s_1, \ldots s_t, \ldots$, then integer values of two successive bytes, $z_t=256s_{2t}+s_{2t+1}$, will be evenly distributed over $Z_{65536}$. In the exemplary embodiment of the invention, SOBER-II is initialized using a session key and possibly some additional data, to produce sufficient bytes of output, which are denoted $s_0, s_1, \ldots s_t, \ldots$. The half-round keys are designed to be evenly distributed. One method to generate evenly distributed half-round keys is to use the integer value of two successive bytes $z_t=256s_{2t}+s_{2t+1}$, only if $z_t$ is less than 65504. Since 65504 can be factored by the integer values 356 (2p=356) and 368 (2q=368), an evenly distributed number $z_t$ between 0 and 65503 that is reduced modulo-356 or modulo-368 will also be evenly distributed over $Z_{356}$ and $Z_{368}$ respectively.

Figure 5:
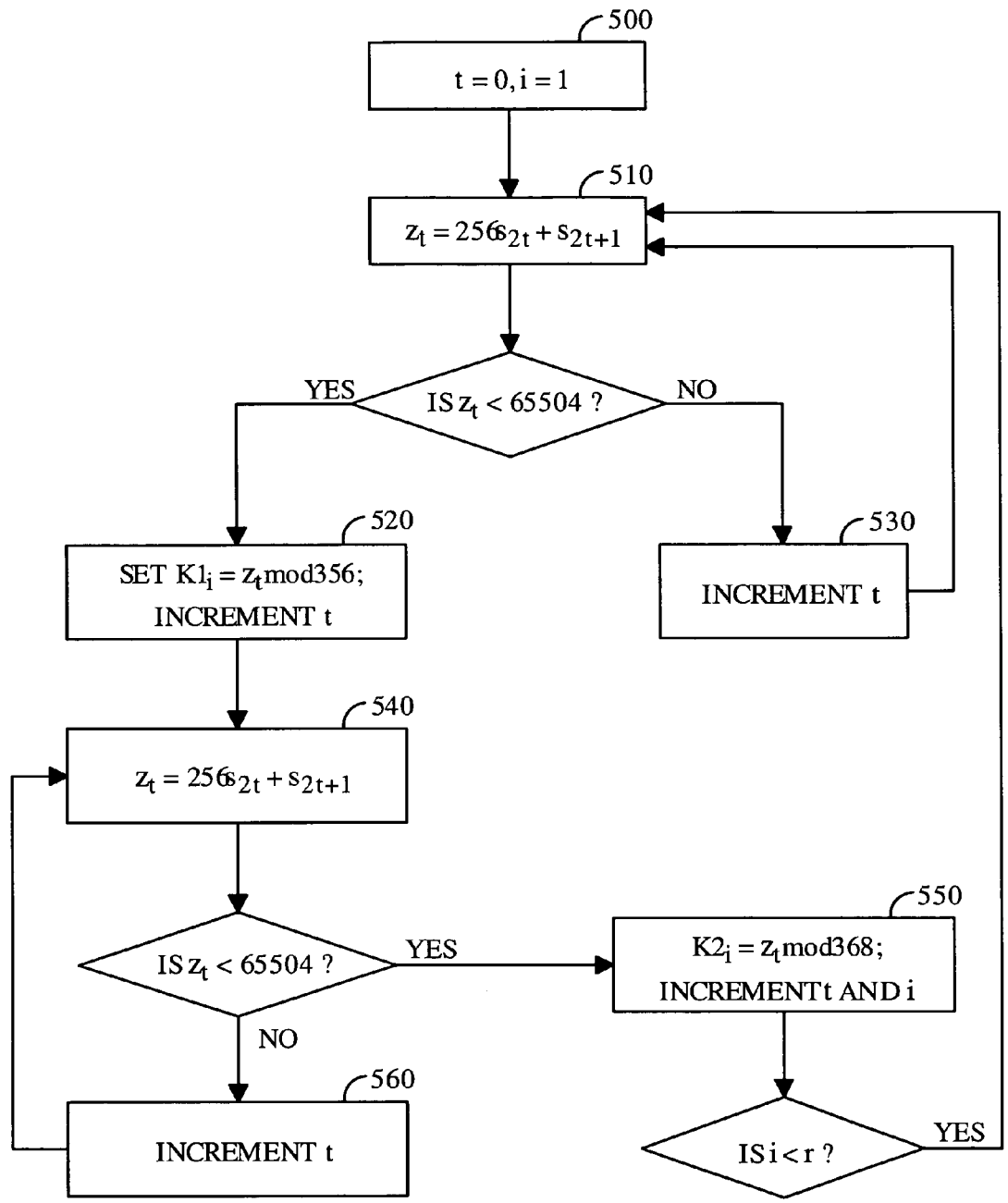
FIG. 5 is a flow chart showing the derivation of half-round keys $K1_i$ and $K2_i$, as implemented in the enciphering computation of FIG. 4.

Starting with t=0, the value of $z_t$ is calculated. If $z_t$ is not less than 65504, then t is incremented and the value of $z_t$ is calculated for the new value of t. This process is repeated until a value of $z_t$ is found that is less than 65504. This value of $z_t$ that is less than 65504 is then reduced modulo-356 to obtain $K1_1$. After determining $K1_1$, the value of t is incremented and the value of $z_t$ is calculated for the new value of t. If $z_t$ is not less than 65504, then t is incremented and the value of $z_t$ is calculated for the new value of t. This process is repeated until a new value of $z_t$ is found that is less than 65504. This value of $z_t$ that is less than 65504 is then reduced modulo-368 to obtain $K2_1$. Having determined $K1_1$ and $K2_1$, t is incremented and the process returns to the beginning of the method without setting t to 0. The method repeats to determine $K1_2$ and $K2_2$, $K1_3$ and $K2_3$, and so forth until all half-round keys have been obtained. FIG. 5 is a flow chart detailing this iterative process.

At step 500, index t is set to equal 0 and round number i is set to 1. At step 510, intermediate value $z_t$ is determined by the relationship $z_t=256s_{2t}+s_{2t+1}$. If $z_t$ is less than 65504, then go to step 520. If $z_t$ is not less than 65504, then go to step 530. At step 520, $K1_i$ is set equal to $z_t$mod356, index t is incremented, and the process flow proceeds to step 540. At step 530, index t is incremented and the process flow proceeds to step 510. At step 540, value $z_t$ is determined by the relationship $z_t=256s_{2t}+s_{2t+1}$, wherein the index t has been incremented in step 520. If $z_t$ is less then 65504, then go to step 550, otherwise, go to step 560. At step 550, $K2_i$ is set equal to $z_t$mod368, and indexes t and i are incremented. If i<r, then return to step 510. At step 560, index t is incremented and the program flow proceeds to step 540.

Figure 6:
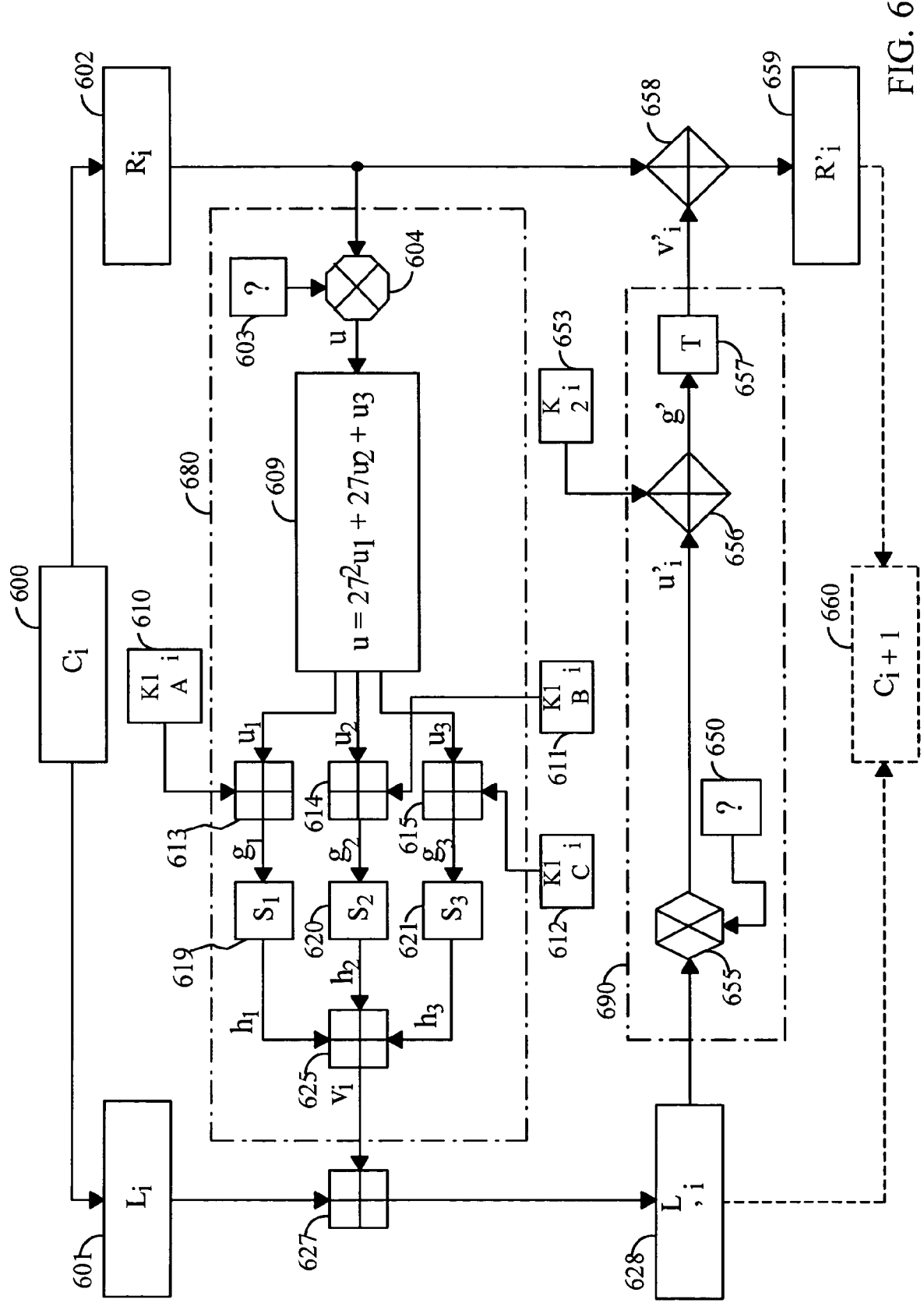
FIG. 6 is a block diagram of another enciphering computation over $Z_{32751}$.

In another embodiment of the invention, a keyed integer permutation, which is discussed broadly in FIG. 2, is implemented over $Z_{32751}$, with p=$3^3$ and q=1213. (Note that 32751=$3^3$×1213.) FIG. 6 is a block diagram of one round of the method using p=$3^3$ and q=1213. Input $C_i$ 600 is separated into two portions, portion $L_i$ 601 and portion $R_i$ 602, such that $C_i=L_i*1213+R_i$. Portion $L_i$ 601 can be determined by the relationship $L_i=C_i$ div (1213) and portion $R_i$ 602 can be determined by the relationship $R_i=C_i$ mod(1213). Portion $R_i$ 602 and constant α 603 are multiplied together by modulo-$27^3$ multiplier 604 to obtain multiplication result u. Constant α 603 is chosen from the set $Z_{19683}$ so that constant α 603 and number $27^3$ ($27^3$=19683) are relatively prime. At step 609, u is factored by the relationship $u=27^2u_1+27u_2+u_3$ to obtain terms $u_1, u_2$, and $u_3$.

Term $u_1$ and sub-key value $K1A_i$ 610 are added together using a modulo-27 adder 613 to obtain substitution input value $g_1$. Term $u_2$ and sub-key value $K1B_i$ 611 are added together using a modulo-27 adder 614 to obtain substitution input value $g_2$. Term $u_3$ and sub-key value $K1C_i$ 612 are added together using a modulo-27 adder 615 to obtain substitution input value $g_3$. It should be noted that the method herein described has numerous possible forms of implementation, which depend upon the appropriate choice of p and q, or u. For example, the number of adders would be increased if u is factored into four or more terms (e.g., $u=27^3u_1+27^2u_2+27u_3+u_4$), rather than the three terms used at step 609. With an increased number of adders, an appropriate number of sub-key values would also be needed. The sub-key values $K1A_i$ 610, $K1B_i$ 611 and $K1C_i$ 612 are chosen from elements of the set $Z_{27}$ and are determined in a method that will be discussed below. This method can be made to generate more sub-key values without excessive experimentation in order to satisfy other embodiments of the invention, such as the case when u is factored into four or more terms.

Substitution input value $g_1$ is operated upon by substitution box $S_1$ 619 to obtain substituted value $h_1$. Substitution input value $g_2$ is operated upon by substitution box $S_2$ 620 to obtain substituted value $h_2$. Substitution input value $g_3$ is operated upon by substitution box $S_3$ 621 to obtain substituted value $h_3$. Substituted value $h_1$, substituted value $h_2$, and substituted value $h_3$ are added together by modulo-27 adder 625 to determine half-round value $v_i$. Half-round value $v_i$ and portion $L_i$ 601 are added together using a modulo-27 adder 627 to obtain portion $L'_i$ 628.

Portion $L'_i$ 628 and constant β 650 are multiplied by modulo-1213 multiplier 655 to obtain multiplication result $u'_i$. Constant β 650 is chosen from the non-zero elements of the set $Z_{1213}$. Multiplication result $u'_i$ and half-round key value $K2_i$ 653 are added together using a modulo-1213 adder 656 to obtain substitution input value $g'$. Substitution input value $g'$ is sent to substitution box T 657 to obtain half-round value $v'_i$. Half-round value $v'_i$ and portion $R_i$ 602 are added together using a modulo-1213 adder 658 to obtain portion $R'_i$ 659. Portion $L'_i$ 628 and portion $R'_i$ 659 are used in the next iterative round. In the alternative, portion $L'_i$ 628 is multiplied by numerical value=1213 and then added to portion $R'_i$ 659 to form portion $C_{i+1}$ 660.

Determination of Half-Round Key Values $K1_i = \{K1A_i, K1B_i, K1C_i\}$ and $K2_i$ Half-round key values in this embodiment of the invention are generated by the SOBER II stream cipher. However, any stream cipher can be used to generate the half-round key values if the stream cipher produces bytes that are evenly distributed. Note that if such a stream cipher produces bytes of output, denoted $s_0, s_1, \ldots, s_t, \ldots$, then integer values of two successive bytes, $z_t = 256 s_{2t} + s_{2t+1}$, will be evenly distributed over $Z_{6556}$.

Figure 7:
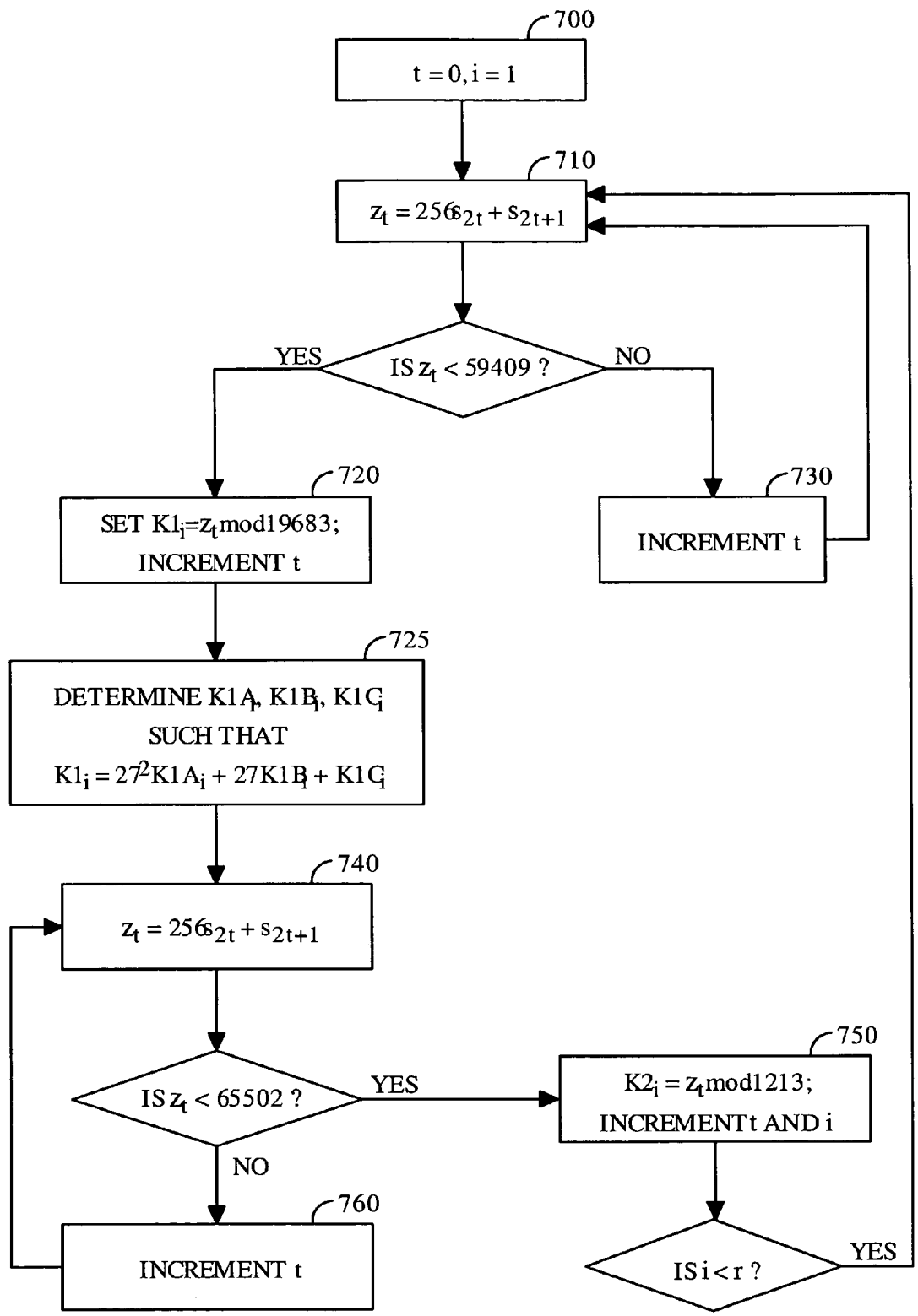
FIG. 7 is a flow chart showing the derivation of half-round keys $K1_i$ and $K2_i$, as implemented in the enciphering computation of FIG. 6.

The set of subkey values $K1_i = \{K1A_i, K1B_i, K1C_i\}$ is determined through the observation that if a number is evenly distributed between 0 and 59048 ($59049 = 3 \times 27^3$) and is reduced modulo-$27^3$, then the number is also evenly distributed over $Z_{27} \times Z_{27} \times Z_{27}$. The half-round key value $K2_i$ is determined through the observation that if a number is evenly distributed between 0 and 65501 (where $65502 = 54 \times 1213$) and is reduced modulo-1213, then the number is also evenly distributed over $Z_{1213}$. Using these observations, an exemplary method for determining values for $K1_i = \{K1A_i, K1B_i, K1C_i\}$ and $K2_i$, where $1 \leq i \leq r$, comprises the steps detailed in FIG. 7.

At step 700, index t is set to equal 0 and round number i is set to 1. At step 710, intermediate value $z_t$ is determined by the relationship $z_t = 256 s_{2t} + s_{2t+1}$. If $z_t$ is less than 59049, then go to step 720. If $z_t$ is not less than 59049, then go to step 730. At step 730, index t is incremented and the process flow proceeds to step 710. At step 720, $K1_i$ is set equal to $z_t \bmod 19683$, and index t is incremented. At step 725, determine values for $K1A_i, K1B_i, K1C_i$ such that $K1_i = 27^2 K1A_i + 27 K1B_i + K1C_i$. After step 725, the program flow proceeds to step 740. At step 740, value $z_t$ is determined by the relationship $z_t = 256 s_{2t} + s_{2t+1}$, wherein the index t has been incremented in step 720. If $z_t$ is less then 65502, then go to step 750, otherwise, go to step 760. At step 750, $K2_i$ is set equal to $z_t \bmod 1213$, and indexes t and i are incremented. If $i < r$, then return to step 710. At step 760, index t is incremented and the program flow proceeds to step 740.

Using the method described above, each of the subkeys $K1A_i, K1B_i, K1C_i$, where $1 \leq i \leq r$, are evenly distributed over $Z_{27}$ and the second half-round keys $K2_i$, where $1 \leq i \leq r$, are evenly distributed over $Z_{1213}$. Substitution boxes can be chosen to have satisfactory cryptographic properties such as non-linearity and randomness. If the half-round keys are uniformly distributed then the inputs to the substitution boxes will be uniformly distributed and independent.

The keyed integer permutation methods herein described are intended for use in message authentication codes, but may be used anywhere where a keyed permutation of a set of integers is required. For example, the embodiments of the invention herein described can also be used to encrypt integers in the set $\{0, 1, \ldots, N-1\}$ to other integers in the set $\{0, 1, \ldots, N-1\}$, in a manner similar to the manner that DES encrypts integers in the set $\{0, 1, \ldots, 2^{64}-1\}$ to other integers in the set $\{0, 1, \ldots, 2^{64}-1\}$.

The decryption process of the keyed integer permutation herein described is identical to the encryption process except the order of the two half-round functions within each round is reversed, the order of the half-round key values within each round is reversed, the output $v_i$ is subtracted modulo-p from $L_i$ and the output $v'_i$ is subtracted modulo-q from $R_i$.

Figure 8:
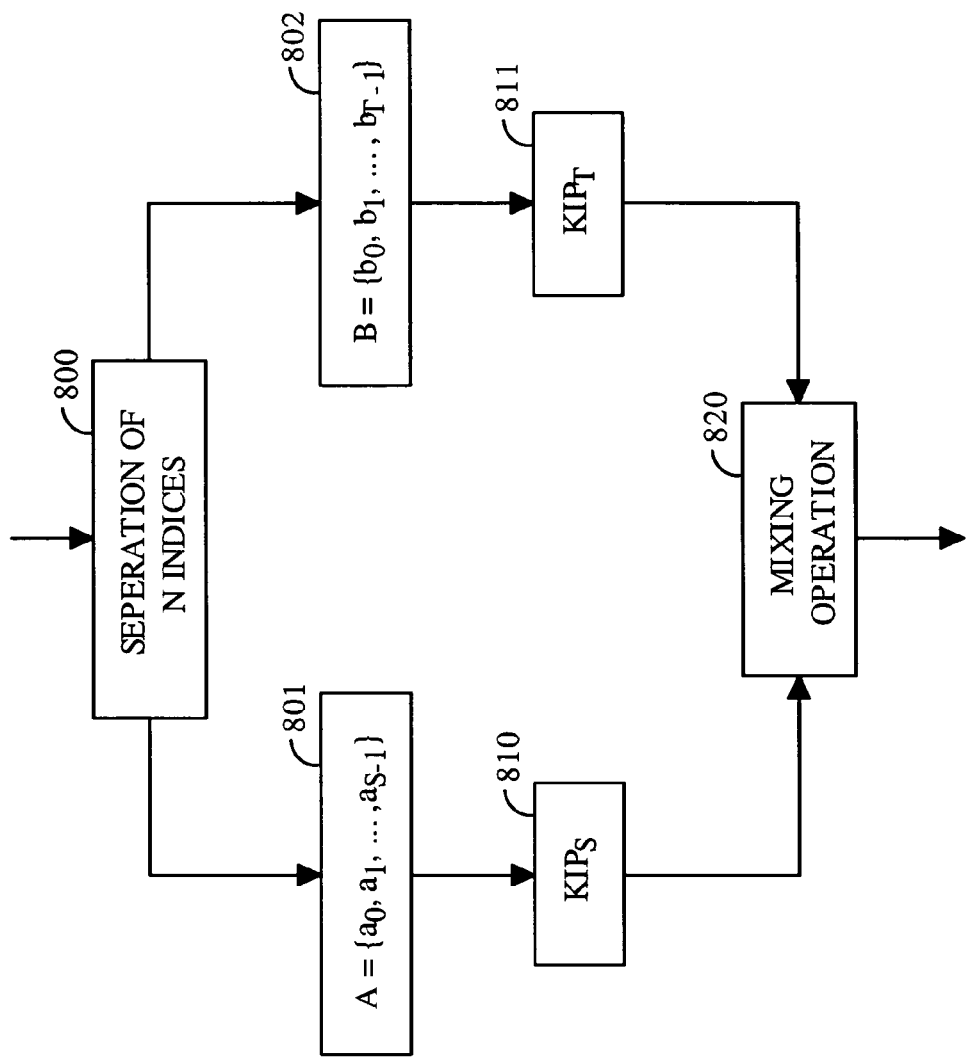
FIG. 8 is a block diagram of an enciphering computation that is an embodiment of the invention, wherein the enciphering computation is performed over $Z_N$, and N is a prime number.

FIG. 8 is a block diagram of another exemplary embodiment of the invention, wherein a keyed integer permutation is constructed over $Z_N$ and N is prime. Let $N = S + T$. It should be noted that for every value of $N \geq 13$, there exists two composites S and T such that $N = S + T$. Hence, at step 800, a group of N indices is separated into section A 801 composed of S indices and section B 802 composed of T indices. The indices of section A 801 are relabeled $\{a_0, a_1, \ldots a_{s-1}\}$ and the indices of section B 802 is relabeled $\{b_0, b_1, \ldots, b_{T-1}\}$. The indices of section A 801 are permuted according to a keyed integer permutation $KIP_S$ 810. Keyed integer permutation $KIP_S$ 810 can be implemented according to the embodiments of the invention described above. The indices of section B 802 are permuted according to a keyed integer permutation $KIP_T$ 811. Keyed integer permutation $KIP_T$ 811 can be implemented according to the embodiments of the invention described above.

Hence, a prime round of $KIP_N$ can be defined as:
$KIP_{A,B}(x) = KIP_S(x)$, if $x \in \{a_0, a_1, \ldots, a_{S-1}\}$, or
$KIP_T(x)$, if $x \in \{b_0, b_1, \ldots, b_{T-1}\}$.

At step 820, the output of $KIP_{A,B}(x)$ undergoes a "mixing" operation, such as an affine operation $Aff_S(x) = U^*x + V (\bmod N)$, where $1 \leq U \leq N-1$, and the values of U and V can be dependent upon a secure key. Mathematically, if an operator B: C→D, is defined by Br=Ar+b, where C, D⊆R, b is a fixed element of D, r is an element of C, and A is a linear operator mapping C onto D, then B is an affine operator.

The general method of FIG. 8 is to separate a set with a prime number of elements into two or more sets, wherein each set is composed of a non-prime number of elements, and to then perform a keyed integer permutation, as described in FIG. 2 and other various embodiments of the invention, on the composite sets. Since a permutation of the elements of one set will result in an output that is defined by that one set, a mixing operation is performed to intersperse elements of one set with another set after each round.

In one embodiment of the invention, as described broadly in FIG. 8, wherein N is a prime number, let $N = S + T$, such that S and T are composites. Define $A = \{0, 1, S-1\}$, and $B = \{S, \ldots, N-1\}$, so that the number of elements in set A is $|A| = S$ and the number of elements in the set B is $|B| = T$. Then a prime round can be defined as $KIP_{A,B}(x) = KIP_S(x)$, if $0 \leq x \leq S-1$, and $KIP_{A,B}(x) = S + KIP_T(x-S)$, if $S \leq x \leq N-1$.

In another embodiment of the invention, as described broadly in FIG. 8, wherein N is a prime number, let $N = 2T+1$, such that T and T+1 are composites. Define $A = \{0, 2, 4, \ldots, 2T\} = \{2y: y \in Z_{T+1}\}$ and $B = \{1, 3, 5, \ldots, 2T-1\} = \{2y+1: y \in Z_T\}$. Hence, the set A contains even values and set B contains odd values. A prime round can then be defined as $KIP_{A,B}(x) = 2KIP_{T+1}(y)$, if $x = 2y$, and $KIP_{A,B}(x) = 1 + 2KIP_T(y)$, if $x = 2y+1$.

In yet another embodiment of the invention, as described in FIG. 8, fixed constants can be used in the affine mapping operation of step 820. The values of U and V are chosen such that $Prob(Aff_{U,V}(x) \text{ in A}: x \text{ in A})$ is approximately $|A|/N$. The values of U and V depend upon the partition of the elements in sets A and B. The sets A and B are chosen so that $|A| \sim |B| \sim (N/2)$. A permutation $Y_3 = KIP_N(X_0)$ has four prime rounds and three affine rounds, wherein the permutation is defined by:

$Y_0 = KIP_{A,B}(X_0)$,
$X_1 = Aff_{U,V}(Y_0)$, $Y_1 = KIP_{A,B}(X_1)$,
$X_2 = Aff_{U,V}(Y_1)$,
$Y_2 = KIP_{A,B}(X_2)$,
$X_3 = Aff_{U,V}(Y_2)$, and
$Y_3 = KIP_{A,B}(X_3)$.

$KIP_A$ and $KIP_B$ are assumed to be secure with key lengths equal to the key length of $KIP_N$. $KIP_N$ must have a key schedule, such as SOBER II, to derive the eight half-round keys required for $KIP_A$ and $KIP_B$ in four prime rounds. This construction is believed to result in a permutation that is secure.

Other embodiments may be implemented to use a larger number of prime rounds and/or key dependent affine rounds. If more prime rounds are used, then the prime round function can be constructed from weaker keyed integer permutations to increase speed.

Thus, a method for constructing keyed integer permutations over $Z_N$ has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of encrypting data by generating a keyed integer permutation on an N-bit block of data representing an encryption input value, comprising:

obtaining an encrypted final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second half-round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the encrypted final result;

wherein the first half-round key and the second half-round key are generated by a key generation method comprising the steps of:

setting an index t to zero;

generating a plurality of evenly distributed bytes;

adding together a first pair of successive elements of the plurality of evenly distributed bytes, selected using the index t, to produce a first intermediate value, wherein one of the first pair of successive elements is first multiplied by a multiplication number;

checking the first intermediate value to determine if the first intermediate value is less than a first predetermined amount;

incrementing the index t and returning to the step of adding together the first pair of successive elements of the plurality of evenly distributed bytes if the first intermediate value is greater that the first predetermined amount;

modularly reducing the first intermediate value by a first integer value to produce the first half-round key and incrementing the index t;

adding together a second pair of successive elements of the plurality of evenly distributed bytes, selected using the index t, to produce a second intermediate value, wherein one of the second pair of successive elements is first multiplied by the multiplication number;

checking the second intermediate value to determine if the second intermediate value is less than a second predetermined amount;

incrementing the index t and returning to the step of adding together the second pair of successive elements of the plurality of evenly distributed bytes if the second intermediate value is greater that the second predetermined amount;

modularly reducing the second intermediate value by a second integer value to produce the second half-round key and incrementing the index t;

returning to the key generation method step of adding together a first pair of successive elements until respective first half-round key and second half-round key pairs are generated for use in each round of the plurality of rounds, wherein each pair of the plurality of first half-round key and second half-round key pairs is associated with a respective round in the plurality of rounds.

2. The key generation method of claim 1, wherein the first predetermined amount is equal to the second predetermined amount.

3. The key generation method of claim 1, wherein the key generation method further comprises the step of determining values for a plurality of subkeys $\{a_{1,i}, a_{2,i}, \ldots, a_{n,i}\}$, such that first half-round key $K1_i = x^{n-1} a_{1,i} + x^{n-2} a_{2,i} + \ldots + a_{n,i}$, wherein n>2, x is a factor of the first predetermined amount, and i identifies an iterative round.

4. The method of claim 3, wherein the first nonlinear function is a method comprising the steps of:

multiplying the second portion by a first constant value to produce a first multiplication result;

decomposing the first multiplication result into a plurality of terms, represented by $u_n$, such that the first multiplication result equals $x^{n-1} u_1 + x^{n-2} u_2 + \ldots + u_n$;

modularly adding each of the plurality of terms with an associated one of the plurality of subkeys $a_{1,i}, a_{2,i}, \ldots, a_{n,i}$, to produce a plurality of substitution input values;

inputting each of the plurality of substitution input values into an associated one of a plurality of substitution boxes to produce a plurality of substituted values; and modularly adding at least two of the plurality of substituted values to produce the first half-round value.

5. The method of claim 1, wherein the integer value p is equal to 178, and the integer value q is equal to 184.

6. The method of claim 1, wherein the integer value p is equal to $3^3$, and the integer value q is equal to 1213.

7. A method of encrypting data by generating a keyed integer permutation on an N-bit block of data representing an encryption input value, comprising:

obtaining an encrypted final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second-half round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the encrypted final result;

wherein the first nonlinear function of each round is a method comprising the steps of:

multiplying the second portion by a first constant value to produce a first multiplication result;

combining the first multiplication result with the first half-round key to produce a first combined result;

substituting the first combined result with a permutation of the first combined result to produce the first half-round value, wherein the step of substituting the first combined result comprises the steps of:

decomposing the first combined result into a substitution indicator value and a substitution input value;

using the substitution indicator value to choose one of a plurality of substitution boxes; and inputting the substitution input value into a chosen substitution box from the first plurality of substitution boxes to produce the first half-round value.

8. The method of claim 7, wherein the integer value p is equal to 178, and the integer value q is equal to 184.

9. The method of claim 7, wherein the integer value p is equal to $3^3$, and the integer value q is equal to 1213.

10. The method of claim 7, wherein the second nonlinear function of each round is a method comprising the steps of:

multiplying the third portion by a second constant value to produce a second multiplication result;

combining the second multiplication result with the second half-round key to produce a second combined result;

substituting the second combined result with a permutation of the second combined result to produce the second half-round value, wherein the step of substituting the second combined result comprises the steps of:

decomposing the second combined result into a substitution indicator value and a substitution input value;

using the substitution indicator value to choose one of a second plurality of substitution boxes; and inputting the substitution input value into a chosen substitution box from the second plurality of substitution boxes to produce the second half-round value.

11. A method of encrypting data by generating a keyed integer permutation on an N-bit block of data representing an encryption input value, comprising:

obtaining an encrypted final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second half-round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the encrypted final result;

wherein the second nonlinear function of each round is a method comprising the steps of:

multiplying the third portion by a second constant value to produce a second multiplication result;

combining the second multiplication result with the second half-round key to produce a second combined result;

substituting the second combined result with a permutation of the second combined result to produce the second half-round value, wherein the step of substituting the second combined result comprises the steps of:

decomposing the second combined result into a substitution indicator value and a substitution input value;

using the substitution indicator value to choose one of a second plurality of substitution boxes; and inputting the substitution input value into a chosen substitution box from the second plurality of substitution boxes to produce the second half-round value.

12. The method of claim 11, wherein the integer value p is equal to 178, and the integer value q is equal to 184.

13. The method of claim 11, wherein the integer value p is equal to $3^3$, and the integer value q is equal to 1213.

14. A wireless communications device, comprising:

a processor; and a storage medium, wherein the storage medium stores instructions executable by the processor that will permute an N-bit block of data representing an input value, and wherein the N-bit block of data indices is permuted by a method comprising the steps of:

obtaining a final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second half-round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the final result;

wherein the first half-round key and the second half-round key are generated by a key generation method comprising the steps of:

setting an index t to zero;

generating a plurality of evenly distributed bytes;

adding together a first pair of successive elements of the plurality of evenly distributed bytes, selected using the index t, to produce a first intermediate value, wherein one of the first pair of successive elements is first multiplied by a multiplication number;

checking the first intermediate value to determine if the first intermediate value is less than a first predetermined amount;

incrementing the index t and returning to the step of adding together the first pair of successive elements of the plurality of evenly distributed bytes if the first intermediate value is greater that the first predetermined amount;

modularly reducing the first intermediate value by a first integer value to produce the first half-round key and incrementing the index t;

adding together a second pair of successive elements of the plurality of evenly distributed bytes, selected using the index t, to produce a second intermediate value, wherein one of the second pair of successive elements is first multiplied by the multiplication number;

checking the second intermediate value to determine if the second intermediate value is less than a second predetermined amount;

incrementing the index t and returning to the step of adding together the second pair of successive elements of the plurality of evenly distributed bytes if the second intermediate value is greater that the second predetermined amount;

modularly reducing the second intermediate value by a second integer value to produce the second half-round key and incrementing the index t;

returning to the key generation method step of adding together a first pair of successive elements until respective first half-round key and second half-round key pairs are generated for use in each round of the plurality of rounds, wherein each pair of the plurality of first half-round key and second half-round key pairs is associated with a respective round in the plurality of rounds.

15. The wireless communications device of claim 14, wherein the first predetermined amount is equal to the second predetermined amount.

16. The wireless communications device of claim 14, wherein the key generation method further comprises the step of determining values for a plurality of subkeys $\{a_{1,i}, a_{2,i}, \ldots, a_{n,i}\}$, such that first half-round key $K1_i = x^{n-i}a_{1,i} + x^{n-2}a_{2,i} + \ldots + a_{n,i}$, wherein n>2, x is a factor of the first predetermined amount, and i identifies an iterative round.

17. The wireless communications device of claim 14, wherein the first nonlinear function is a method comprising the steps of:

multiplying the second portion by a first constant value to produce a first multiplication result;

decomposing the first multiplication result into a plurality of terms, represented by $u_n$, such that the first multiplication result equals $x^{n-1}u_1 + x^{n-2}u_2 + \ldots + u_n$;

modularly adding each of the plurality of terms with an associated one of the plurality of subkeys $a_{1,i}, a_{2,i}, \ldots, a_{n,1}$, to produce a plurality of substitution input values;

inputting each of the plurality of substitution input values into an associated one of a plurality of substitution boxes to produce a plurality of substituted values; and modularly adding at least two of the plurality of substituted values to produce the first half-round value.

18. The wireless communications device of claim 14, wherein the integer value p is equal to 178, and the integer value q is equal to 184.

19. The wireless communication device of claim 14, wherein the integer value p is equal to $3^3$, and the integer value q is equal to 1213.

20. A wireless communication device, comprising:

a processor; and a storage medium, wherein the storage medium stores instructions executable by the processor that will permute an N-bit block of data representing an input value, and wherein the N-bit block of data indices is permuted by a method comprises the steps of:

obtaining an encrypted final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second-half round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the encrypted final result;

wherein the first nonlinear function of each round is a method comprising the steps of:

multiplying the second portion by a first constant value to produce a first multiplication result;

combining the first multiplication result with the first half-round key to produce a first combined result;

substituting the first combined result with a permutation of the first combined result to produce the first half-round value, wherein the step of substituting the first combined result comprises the steps of:

decomposing the first combined result into a substitution indicator value and a substitution input value;

using the substitution indicator value to choose one of a plurality of substitution boxes; and inputting the substitution input value into a chosen substitution box from the first plurality of substitution boxes to produce the first half-round value.

21. The wireless communication device of claim 20, wherein the integer value p is equal to 178, and the integer value q is equal to 184.

22. The wireless communication device of claim 20, wherein the integer value p is equal to $3^3$, and the integer value q is equal to 1213.

23. The wireless communication device of claim 20, wherein the second nonlinear function of each round is a method comprising the steps of:

multiplying the third portion by a second constant value to produce a second multiplication result;

combining the second multiplication result with the second half-round key to produce a second combined result;

substituting the second combined result with a permutation of the second combined result to produce the second half-round value, wherein the step of substituting the second combined result comprises the steps of:

decomposing the second combined result into a substitution indicator value and a substitution input value;

using the substitution indicator value to choose one of a second plurality of substitution boxes; and inputting the substitution input value into a chosen substitution.

24. A wireless communications device, comprising:

a processor; and a storage medium, wherein the storage medium stores instructions executable by the processor that will permute an N-bit block of data representing an input value, and wherein the N-bit block of data indices is permuted by a method comprising the steps of:

obtaining a final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second half-round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the encrypted final result;

wherein the second nonlinear function of each round is a method comprising the steps of:

multiplying the third portion by a second constant value to produce a second multiplication result;

combining the second multiplication result with the second half-round key to produce a second combined result;

substituting the second combined result with a permutation of the second combined result to produce the second half-round value, wherein the step of substituting the second combined result comprises the steps of:

decomposing the second combined result into a substitution indicator value and a substitution input value;

using the substitution indicator value to choose one of a second plurality of substitution boxes; and inputting the substitution input value into a chosen substitution box from the second plurality of substitution boxes to produce the second half-round value.

25. The wireless communication device of claim 24, wherein the integer value p is equal to 178, and the integer value q is equal to 184.

26. The wireless communication device of claim 24, wherein the integer value p is equal to $3^3$, and the integer value q is equal to 1213.

27. Apparatus for encrypting data by generating a keyed integer permutation on an N-bit block of data representing an encryption input value, comprising:

means for obtaining an encrypted final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:

separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;

deriving a first half-round value from the second portion and a first half-round key, wherein the first half-round value is an output of a first nonlinear function operating on the second portion and the first half-round key, and wherein the first half-round key is generated for use in the current round;

using a modulo-p adder to combine the first half-round value with the first portion to produce a third portion;

deriving a second half-round value from the third portion and a second half-round key, wherein the second half-round value is an output of a second nonlinear function operating on the third portion and the second half-round key, and wherein the second half-round key is generated for use in the current round;

using a modulo-q adder to combine the second half-round value and the second portion to produce a fourth portion; and repeating the round steps using the third portion and the fourth portion generated in a current round as the input value for a subsequent round until a final round;

the final round further comprising the steps of:

multiplying the third portion generated in the final round with the integer value q; and combining the multiplied third portion with the fourth portion generated in the final round to produce the encrypted final result;

wherein the first half round key and the second half-round key are generated by a key generation method comprising the steps of:

setting an index t to zero;

generating a plurality of evenly distributed bytes;

adding together a first pair of successive elements of the plurality of evenly distributed bytes, selected using the index t, to produce a first intermediate value, wherein one of the first pair of successive elements is first multiplied by a multiplication number;

checking the first intermediate value to determine if the first intermediate value is less than a first predetermined amount;

incrementing the index t and returning to the step of adding together the first pair of successive elements of the plurality of evenly distributed bytes if the first intermediate value is greater that the first predetermined amount;

modularly reducing the first intermediate value by a first integer value to produce the first half-round key and incrementing the index t;

adding together a second pair of successive elements of the plurality of evenly distributed bytes, selected using the index t, to produce a second intermediate value, wherein one of the second pair of successive elements is first multiplied by the multiplication number;

checking the second intermediate value to determine if the second intermediate value is less than a second predetermined amount;

incrementing the index t and returning to the step of adding together the second pair of successive elements of the plurality of evenly distributed bytes if the second intermediate value is greater that the second predetermined amount;

modularly reducing the second intermediate value by a second integer value to produce the second half round key and incrementing the index t;

returning to the key generation method step of adding together a first pair of successive elements until respective first half-round key and second half-round key pairs are generated for use in each round of the plurality of rounds, wherein each pair of the plurality of first half-round key and second half-round key pairs is associated with a respective round in the plurality of rounds.

28. The apparatus of claim 27, wherein the first predetermined amount is equal to the second predetermined amount.

29. The apparatus of claim 27, wherein the key generation method further comprises the step of determining values for a plurality of subkeys $\{a_{1,i}, a_{2,i} \ldots, a_{n,i}\}$, such that first half-round key $K1_i = x^{n-1}a_{1,i} + x^{n-2}a_{2,i} + \ldots + a_{n,i}$, wherein n>2, x is a factor of the first predetermined amount, and i identifies an iterative round.

30. The apparatus of claim 27, wherein the first nonlinear function is a method comprising the steps of:
multiplying the second portion by a first constant value to produce a first multiplication result;
decomposing the first multiplication result into a plurality of terms, represented by $u_n$, such that the first multiplication result equals $x^{n-1}u_1 + x^{n-2}u_2 + \ldots + u_n$;
modularly adding each of the plurality of terms with an associated one of the plurality of subkeys $a_{1,i}, a_{2,i}, \ldots, a_{n,i}$, to produce a plurality of substitution input values;
inputting each of the plurality of substitution input values into an associated one of a plurality of substitution boxes to produce a plurality of substituted values; and
modularly adding at least two of the plurality of substituted values to produce the first half-round value.

31. The apparatus of claim 27, wherein the integer value p is equal to 178, and the integer value q is equal to 184.

32. The apparatus of claim 27, wherein the integer value p is equal to $3^3$, and the integer value q is equal to 1213.

33. Apparatus for encrypting data by generating a keyed integer permutation on an N-bit block of data representing an encryption input value, comprising:
means for obtaining an encrypted final result from the N-bit block of data by performing a plurality of rounds, wherein each bit of the N-bit block of data is associated with an index from a plurality of N indices, and wherein N can be factored into an integer value p greater than one and an integer value q greater than one, each round comprising the steps of:
separating the input value into a first portion and a second portion, wherein the first portion is constructed over a group $Z_p$ and the second portion is constructed over a group $Z_q$, such that the input value can be expressed as a combination of the second portion with a multiple value of the first portion, wherein the multiple value is defined by the integer value q;
deriving a first half-round value from the second portion and a first half-round key, wherein the first half-round value is an output of a first nonlinear function operating on the second portion and the first half-round key, and wherein the first half-round key is generated for use in the current round;
using a modulo-p adder to combine the first half-round value with the first portion to produce a third portion;
deriving a second half-round value from the third portion and a second half-round key, wherein the second half-round value is an output of a second nonlinear function operating on the third portion and the second half-round key, and wherein the second half-round key is generated for use in the current round;
using a modulo-q adder to combine the second half-round value and the second portion to produce a fourth portion; and
repeating the round steps using the third portion and the fourth portion generated in a current round as the input value for a subsequent round until a final round;
the final round further comprising the steps of:
multiplying the third portion generated in the final round with the integer value q; and
combining the multiplied third portion with the fourth portion generated in the final round to produce the encrypted final result;
wherein the first nonlinear function of each round is a method comprising the steps of:
multiplying the second portion by a first constant value to produce a first multiplication result;
combining the first multiplication result with the first half-round key to produce a first combined result;
substituting the first combined result with a permutation of the first combined result to produce the first half-round value, wherein the step of substituting the first combined result comprises the steps of:
decomposing the first combined result into a substitution indicator value and a substitution input value;
using the substitution indicator value to choose one of a first plurality of substitution boxes; and
inputting the substitution input value into a chosen substitution box from the first plurality of substitution boxes to produce the first half-round value.

34. The apparatus of claim 33, wherein the integer value p is equal to 178, and the integer value q is equal to 184.

35. The apparatus of claim 33, wherein the integer value p is equal to $3^3$, and the integer value q is equal to 1213.

36. The apparatus of claim 33, wherein the second nonlinear function of each round is a method comprising the steps of:
multiplying the third portion by a second constant value to produce a second multiplication result;
combining the second multiplication result with the second half-round key to produce a second combined result;
substituting the second combined result with a permutation of the second combined result to produce the second half-round value, wherein the step of substituting the second combined result comprises the steps of:
decomposing the second combined result into a substitution indicator value and a substitution input value;
using the substitution indicator value to choose one of a second plurality of substitution boxes; and
inputting the substitution input value into a chosen substitution box from the second plurality of substitution boxes to produce the second half-round value.

* * * * *

UNITED STATES PATENT AND TRADEMARK OFFICE
CERTIFICATE OF CORRECTION

| | | |
|---|---|---|
| PATENT NO. | : 7,428,305 B1 | Page 1 of 1 |
| APPLICATION NO. | : 09/563648 | |
| DATED | : September 23, 2008 | |
| INVENTOR(S) | : Philip Hawkes, Gregory G. Rose and Roy Franklin Quick, Jr. | |

It is certified that error appears in the above-identified patent and that said Letters Patent is hereby corrected as shown below:

Column 12, Claim 1, line 20, "greater that", should be, --greater than--
Column 17, Claim 20, line 18, "a method comprises the steps of", should be, --a method comprising the steps of--
Column 20, Claim 27, line 48, "greater that", should be, --greater than--

Signed and Sealed this

Third Day of August, 2010

David J. Kappos
*Director of the United States Patent and Trademark Office*